(12) United States Patent
Talati et al.

(10) Patent No.: US 12,257,567 B2
(45) Date of Patent: Mar. 25, 2025

(54) PROCESS FOR PREPARATION OF SUPERABSORBENT POLYMER

(71) Applicant: UPL LTD, Haldia (IN)

(72) Inventors: Paresh Vithaldas Talati, Mumbai (IN); Prashant Vasant Kini, Mumbai (IN)

(73) Assignee: UPL LTD, Haldia (IN)

( * ) Notice: Subject to any disclaimer, the term of this patent is extended or adjusted under 35 U.S.C. 154(b) by 725 days.

(21) Appl. No.: 17/422,831

(22) PCT Filed: Jan. 28, 2020

(86) PCT No.: PCT/IB2020/050640
§ 371 (c)(1),
(2) Date: Jul. 14, 2021

(87) PCT Pub. No.: WO2020/157643
PCT Pub. Date: Aug. 6, 2020

(65) Prior Publication Data
US 2022/0097022 A1    Mar. 31, 2022

(30) Foreign Application Priority Data
Jan. 29, 2019 (IN) .............................. 201931003588

(51) Int. Cl.
| | |
|---|---|
| *B01J 20/26* | (2006.01) |
| *C08F 8/12* | (2006.01) |
| *C08F 220/44* | (2006.01) |
| *C08F 251/00* | (2006.01) |
| *C08J 3/12* | (2006.01) |
| *C08K 3/22* | (2006.01) |
| *C08K 5/01* | (2006.01) |
| *C08K 5/02* | (2006.01) |
| *C08K 5/103* | (2006.01) |

(52) U.S. Cl.
CPC ............... *B01J 20/265* (2013.01); *C08F 8/12* (2013.01); *C08F 220/44* (2013.01); *C08F 251/00* (2013.01); *C08J 3/12* (2013.01); *C08K 3/22* (2013.01); *C08K 5/01* (2013.01); *C08K 5/02* (2013.01); *C08K 5/103* (2013.01); *B01J 2220/68* (2013.01); *C08J 2300/14* (2013.01); *C08J 2303/04* (2013.01)

(58) Field of Classification Search
CPC ......... B01J 20/265; C08F 8/12; C08F 220/44; C08F 251/00; C08J 3/12; C08K 3/22; C08K 5/01; C08K 5/02; C08K 5/103
See application file for complete search history.

(56) References Cited

U.S. PATENT DOCUMENTS

| | | | |
|---|---|---|---|
| 4,732,968 A | 3/1988 | Obayashi et al. | |
| 11,958,925 B2 * | 4/2024 | Kini | .................. C08F 251/00 |
| 2023/0067242 A1 * | 3/2023 | Kini | .................. C08F 251/00 |

FOREIGN PATENT DOCUMENTS

| | | | |
|---|---|---|---|
| CN | 1068339 A | * | 1/1993 |
| WO | 2014032189 A1 | | 3/2014 |

OTHER PUBLICATIONS

Mohan et al., Reactive & Functional Polymers, (2007), v67, p. 844-858.*
International Search Report and Written Opinion for International Application PCT/IB2020/050640; International Filing Date: Jan. 28, 2020; Date of Mailing: Apr. 9, 2020; 10 pages.

* cited by examiner

*Primary Examiner* — Yong L Chu
(74) *Attorney, Agent, or Firm* — CANTOR COLBURN LLP

(57) ABSTRACT

The present invention relates to a process for preparation of superabsorbent polymer with high fluid absorptivity. The present invention also relates to a composition comprising said superabsorbent polymer particles and their use for absorbing aqueous fluids, for example in the agricultural industry.

5 Claims, 1 Drawing Sheet

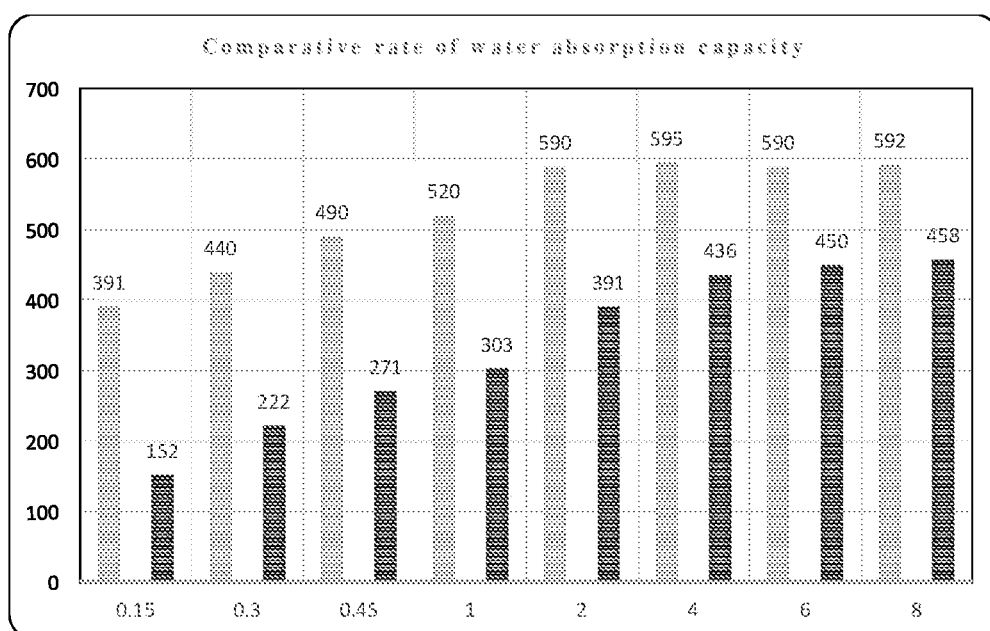

PROCESS FOR PREPARATION OF SUPERABSORBENT POLYMER

CROSS REFERENCE TO RELATED APPLICATIONS

This application is a National Stage application of PCT/IB2020/050640, filed Jan. 28, 2020, which claims the benefit of priority to Indian Patent Application number 201931003588, filed Jan. 29, 2019, both of which are incorporated by reference in their entirety herein.

FIELD OF INVENTION

The present invention relates to a process for preparation of superabsorbent polymer with high fluid absorptivity. The present invention also relates to a composition comprising said superabsorbent polymer particles and their use for absorbing aqueous fluids, for example in the agricultural industry.

BACKGROUND OF INVENTION

Superabsorbent polymers absorb water or fluids several times their weight. Superabsorbent polymer(s) (SAP) improve supply of water in the soil and therefore used in agriculture.

Various superabsorbent polymers are known in the art. Such superabsorbent polymers may be made from polyacrylamide copolymer, cross-linked carboxymethylcellulose, polyvinyl alcohol copolymers, cross-linked polyethylene oxide, starch grafted copolymer of polyacrylonitrile etc. The water absorbance of most superabsorbent polymers has been known to decrease considerably in the presence of salts. Soil incorporated superabsorbent polymers or those that are mixed with fertilizers have been known to suffer from decreased absorbance capacity due to the presence of salts in the soil or fertilizer. Studies have been carried out to study the effect of such salts such as those carried out by Daniel C. Bowman, Richard Y. Evans, and J. L. Paul, J. Amer. Soc. Hort. Sci. May 1990 115:382-386, Fertilizer Salts Reduce Hydration of Polyacrylamide Gels and Affect Physical Properties of Gel-amended Container Media. The paper discusses the decrease in polymer absorption capacity when mixed with salts. It was observed that soluble salts dramatically affect absorption by hydrophilic polyacrylamide gels.

Agriculture requires the use of many compounds to ensure good yields and healthy crops. Most of the fertilizers and nutrients added to the soil are salts that in some way contribute to the improvement in the crops. Salts are also naturally present in the soil, which also contribute to the increased salinity of the soil. In drought prone areas and areas where water management is essential, the salinity in the soil is higher, as water required to wash these salts away is scarce. In such soils, where water is scarce or where water management is required or even where normal salts are added to the soil, addition of superabsorbent polymers may not result in the desired effect that is, increased water availability. Salts in the environment around the superabsorbent polymer influence the performance capacity of the polymer.

Specifically, when mixed with soil for agricultural purposes, superabsorbent polymers are expected to perform exceptionally well by absorbing water many times the weight of the polymer. When introducing other components such as fertilizers etc., the capacity of the superabsorbent polymers to absorb water decrease considerably, naturally present salts in the soil may also contribute to a decrease in absorption capacity.

The known preparation process for such super absorbent polymers includes a process by reverse phase suspension polymerization and a process by aqueous solution polymerization.

WO2014032189 disclose a method of forming polymer materials, particularly a porous hydrogel by exothermic polymerization reaction comprising: providing, in a reaction vessel, a monomer having a vinyl functionality, a cross-linker, an organic solvent, a first polymeric material comprising poly acrylic acid, and a second polymeric material comprising a poly glycol other than polyethylene glycol and mixing the mixture. The bulk hydrogel product thus formed is then cut by using a grinder and then dried. During the bulk polymerization, a thick viscous dough of the superabsorbent polymer with high viscosity is formed which is very hard to manage, cut and process the high viscous material further during granulation. Further, it has problems in that as the viscosity of the mixture is too high, the reaction sites increase, the particle size increases, the strength of the polymer network of super absorbent polymer decreases which ultimately affects the absorption property of the polymer.

Thus, there is a need in the art for simple and industrially viable process of preparing superabsorbent polymer in granular form. Accordingly, the present invention provides a feasible and economical route for preparation of superabsorbent polymer by overcoming the problem faced during the preparation of SAP. Surprisingly it has been found that the present invention provides super absorbent polymer with desired properties specifically the particles of super absorbent polymer have high absorbance capacity and retention properties for aqueous fluids.

SUMMARY OF THE INVENTION

In an aspect the present invention provides a process for preparation of superabsorbent polymer.

In another aspect the present invention provides a process for preparation of superabsorbent polymer comprising saponification of a polymer in presence of suitable solvent.

In another aspect the present invention provides a process for preparation of superabsorbent polymer comprising saponification of polymer in presence of suitable surfactant.

In another aspect the present invention provides a process for preparation of superabsorbent polymer comprising saponification of polymer in presence of suitable solvent and surfactant.

In another aspect the present provides a process for preparation of superabsorbent polymer comprising
  a) graft polymerizing the monomer on the polysaccharide surface in presence of an initiator to form a polymer and
  b) saponifying the polymer in presence of suitable solvent to obtain granulated superabsorbent polymer.

In another aspect the present invention provides a process for preparation of polysaccharide-g-poly (2-propenamide-co-2-propenoic acid) or salts thereof.

In another aspect the present invention provides a process for preparation of starch-g-poly (2-propenamide-co-2-propenoic acid) or salts thereof.

In an aspect the present invention provides superabsorbent polymer having particle size in the range of 0.1 to 150 mesh.

In an aspect the present invention provides superabsorbent polymer having water absorbance capacity in the range of 200-2000 g/g.

In an aspect the present invention provides a composition comprising at least one superabsorbent polymer produced by the present invention.

In an aspect the present invention provides a composition comprising at least one superabsorbent polymer of the present invention and optionally at least one plant advantageous additive.

In an aspect the present invention provides a multi-pack agricultural product comprising:
i) a container comprising at least one superabsorbent polymer of the present invention and optionally at least one plant advantageous additive.
ii) an instruction manual instructing an user to administer the content to a locus.

In an aspect the present invention provides a method of increasing the water absorption capacity of a superabsorbent polymer, the method comprising contacting the superabsorbent polymer produced by the present invention with a plot of soil.

BRIEF DESCRIPTION OF DRAWINGS

FIG. 1 represents comparative Graph table of water absorbance capacity between Comparative example and Example -3.

DETAILED DESCRIPTION OF THE INVENTION

Within the context of this specification, each term or phrase below will include the following meaning or meanings:

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of materials/ingredients used in the specification are to be understood as being modified in all instances by the term "about".

Thus, before describing the present invention in detail, it is to be understood that this invention is not limited to particularly exemplified systems or process parameters that may of course, vary. It is also to be understood that the terminology used herein is for the purpose of describing particular embodiments of the invention only and is not intended to limit the scope of the invention in any manner. The use of examples anywhere in this specification including examples of any terms discussed herein is illustrative only, and in no way limits the scope and meaning of the invention or of any exemplified term. Likewise, the invention is not limited to various embodiments given in this specification. Unless otherwise defined, all technical and scientific terms used herein have the same meaning as commonly understood by one of ordinary skill in the art to which this invention pertains. In the case of conflict, the present document, including definitions will control.

It must be noted that, as used in this specification, the singular forms "a," "an" and "the" include plural referents unless the content clearly dictates otherwise. The terms "preferred" and "preferably" refer to embodiments of the invention that may afford certain benefits, under certain circumstances.

As used herein, the terms "comprising" "including," "having," "containing," "involving," and the like are to be understood to be open-ended, i.e., to mean including but not limited to.

The term "locus" as used herein shall denote the vicinity of a desired crop in which weed control, typically selective weed control is desired. The locus includes the vicinity of desired crop plants wherein the weed infestation has either emerged or is yet to emerge. The term crop shall include a multitude of desired crop plants or an individual crop plant growing at a locus.

In any aspect or embodiment described hereinbelow, the phrase comprising may be replaced by the phrases "consisting of" or "consisting essentially of" or "consisting substantially of" or "containing". In these aspects or embodiment, the combination or composition described includes or comprises or consists of or consists essentially of or consists substantially of the specific components recited therein or adjuvants or excipients not specifically recited therein.

The terms "superabsorbent polymer" or "SAP" or "polymer gel" refer to water swellable polymers that can absorb water many times their weight in an aqueous solution. Without wishing to be bound by theory, the term superabsorbent polymers also apply to polymers that absorb water as well as de-sorb the absorbed water. The superabsorbent polymer may be selected from but not limited to water-swellable or water absorbing or water-retentive polymers such as cross-linked polymers that swell without dissolving in the presence of water, and may, absorb at least 10, 100, 1000, or more times their weight in water.

In an aspect the present invention provides a process for preparation of superabsorbent polymer.

In an aspect the present invention provides a process for preparation of superabsorbent polymer comprising saponification of polymer in presence of suitable solvent.

In an aspect the present invention provides a process for preparation of superabsorbent polymer comprising saponification of polysaccharide grafted polymer hydrogel in presence of suitable solvent.

In an aspect the present invention provides a process for preparation of superabsorbent polymer comprising saponification of polysaccharide grafted polymer hydrogel in presence of suitable surfactant.

In an aspect the present invention provides a process for preparation of superabsorbent polymer comprising saponification of polysaccharide grafted polymer hydrogel in presence of suitable solvent and suitable surfactant.

In an aspect the present invention provides a process for preparation of superabsorbent polymer comprising saponification of a polymer in presence of water immiscible solvent.

In an aspect the present invention the polymer for saponification is obtained by graft polymerizing the monomer comprising at least one monomer capable of forming a superabsorbent polymer and polysaccharide in presence of an initiator.

In another aspect the process for preparation of superabsorbent polymer comprising
a) graft polymerizing the monomer comprising at least one monomer capable of forming a superabsorbent polymer and polysaccharide in presence of an initiator to form graft polymer and
b) saponifying the graft polymer in presence of suitable solvent to obtain granulated superabsorbent polymer.

In an embodiment the saponification further comprises a surfactant.

In another aspect the process for preparation of superabsorbent polymer comprising
  a) graft polymerizing the monomer comprising at least one monomer capable of forming a superabsorbent polymer and polysaccharide in presence of an initiator to form polymer and
  b) saponifying the polymer in presence of suitable solvent and surfactant to obtain granulated superabsorbent polymer.

In another aspect the process for preparation of superabsorbent polymer comprising
  a) graft polymerizing the monomer comprising at least one monomer capable of forming a superabsorbent polymer and polysaccharide in presence of an initiator to form starch polymer and
  b) saponifying the polymer in presence of suitable surfactant to obtain granulated superabsorbent polymer.

In an embodiment the monomer comprise an ethylenic monomer having a carboxylic acid substituent or a precursor to a carboxylic acid substituent, e.g., an α,β-unsaturated carboxylic acid or anhydride thereof, typically acrylic acid, or acrylonitrile or a (meth)acrylamide, or an ethylenic monomer having an amine substituent or a precursor to an amine substituent, e.g., N-vinyl acetamide.

In an embodiment, the monomer is Acrylonitrile.

In an embodiment the monomer may be selected from the group consisting of acrylic acid, methacrylic acid, ethacrylic acid, α-chloroacrylic acid, α-cyanoacrylic acid, β-methyl acrylic acid, α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, fumaric acid, tricarboxyethylene, maleic anhydride, vinyl sulfonic acid, allyl sulfonic acid, vinyl toluene sulfonic acid, styrene sulfonic acid, sulfoethyl acrylate, sulfoethyl methacrylate, sulfopropyl acrylate, sulfopropyl methacrylate, sulfopropyl acrylate, sulfopropyl methacrylate, 2-hydroxy-3-methacryloxypropyl sulfonic acid, 2-acrylamido-2-methylpropane sulfonic acid, methacryloxy ethyl phosphate or mixtures thereof.

In an embodiment, the polysaccharide is selected from the group comprising: cellulosic compounds; starches; agarose; alginic acid; alguronic acid; alpha glucan; amylose, amylopectin; arabinoxylan; beta-glucan; callose; capsulan; carrageenan; cellodextrin; cellulin; chitin; chitosan; chrysolaminarin; curdlan; cyclodextrin; DEAE-sepharose; dextran; dextrin; alpha-cyclodextrin; ficoll; fructan; fucoidan; galactoglucomannan; galactomannan; gellan gum; glucan; glucomannan; glycocalyx; glycogen; hemicellulose; hypromellose; icodextrin; kefiran; laminarin; lentinan; levan; lichenin; maltodextrin; mixed-linkage glucan; mucilage; natural gum; oxidized cellulose; paramylon; pectic acid; pectin; pentastarch; pleuran; polydextrose; polysaccharide peptide; porphyran; pullulan; schizophyllan; sepharose; sinistrin; sizofiran; sugammadex; welan gum; xanthan gum; xylan; xyloglucan; zymosan; glycosaminoglycans, chondroitin, chondroitin sulfate, dermatan sulfate, heparan sulfate, heparin, heparinoid, hyaluronan, keratan sulfate, restylane, sodium hyaluronate, sulodexide or mixtures thereof.

In an embodiment, the polysaccharide, particularly starch is used in this invention.

In an embodiment suitable solvent is water immiscible solvent.

Examples of water immiscible solvent are, but not limited to, chlorinated hydrocarbons such as carbon tetrachloride, chloroform, 1,2-dichloroethane, dichloromethane, mono chlorobenzene, dichlorobenzene; aliphatic hydrocarbons such as pentane, hexane, heptane, octane, nonane, decane, dodecane etc, cyclohexane, cyclopentane etc; aromatic hydrocarbons such as toluene, xylene and its isomers, trimethyl benzene, 1-methyl-4-propan-2-ylbenzene (p-cymene); ethers such diethyl ether, di isopropyl ether, diphenyl ether and tert butyl methyl ether or mixtures thereof.

In an embodiment water immiscible solvent is selected from chlorinated hydrocarbons, aliphatic hydrocarbons, aromatic hydrocarbons or mixtures thereof.

In an embodiment water immiscible solvent is selected from toulene, EDC, heptane and cyclohexane.

In an embodiment water immiscible solvent is toluene.

In an embodiment the surfactant is selected from the group consisting of non-ionic or ionic surfactant.

In an embodiment the non-ionic surfactant is selected from the group comprising fatty alcohol ethoxylates, fatty acid ethoxylates, fatty acid ethoxylates, fatty acid esters of polyhydroxy compounds, alkyl poly glycoside, amine oxides or mixtures thereof.

The fatty alcohol ethoxylates may be selected from octaethylene glycol monododecyl ether and Pentaethylene glycol monododecyl ether.

The fatty acid ethoxylates may be selected from N-(2-hydroxyethyl)dodecanamide (Cocamide monoethanolamine) and N,N-bis(hydroxyethyl) dodecanamide (Cocamide di ethanol amine).

The fatty acid ethoxylates may be selected from 2-[4-(2, 4,4-trimethylpentan-2-yl)phenoxy] ethanol (Triton X-100) and 2-[2-[4-(2,4,4-trimethylpentan-2-yl)phenoxy]ethoxy] ethanol (nonidet P 40).

The fatty acid esters of polyhydroxy compounds may be selected from 2,3-dihydroxypropyl octadecenoate (Glycerol monostearate), 2,3-dihydroxypropyl dodecanoate (Glycerol mono laurate), 2-[(2~{R},3~{R},4~{S})-3,4-dihydroxyoxolan-2-yl]-2-hydroxyethyl] dodecanoate (Sorbitan monolaurate), [2-[(2~{R},3~{S},4~{R})-3,4-dihydroxyoxolan-2-yl]-2-hydroxyethyl] octade cenoate (Sorbitan monostearate, Sorbitan tristearate [(2~{R})-2-[(2~{R}, 3~{R},4~{S})-4-hydroxy-3-octadecanoyloxyoxolan-2-yl]-2-octade canoyloxyethyl] octadecenoate, 2-[2-[3,4-bis(2-hydroxyethoxy)oxolan-2-yl]-2-(2-hydroxyethoxy)ethoxy] ethyl dodecanoate (polysorbate 20 or Tween 20), 2-[2-[3,4-bis(2-methoxyethoxy)oxolan-2-yl]-2-(2-methoxyethoxy) ethoxy]ethyl hexade canoate (Tween 40, 2-[2-[3,4-bis(2-methoxyethoxy)oxolan-2-yl]-2-(2-methoxyethoxy) ethoxy] ethyl octadecanoate (Tween 60), Polyoxyethylene sorbitan monostearate, monooctadecanoate and poly(oxy-1,2-ethanediyl), hydroxyethoxy)oxolan-2-yl]-2-(2-hydroxyethoxy) ethoxy]ethyl (~{E})-octadec-9-enoate (Tween 80).

In an embodiment, the fatty acid ester of polyhydroxy compound is selected from 2-[2-[3,4-bis(2-hydroxyethoxy) oxolan-2-yl]-2-(2-hydroxyethoxy)ethoxy]ethyl dodecanoate (polysorbate 20 or Tween 20), 2-[2-[3,4-bis(2-methoxyethoxy)oxolan-2-yl]-2-(2-methoxyethoxy)ethoxy]ethyl hexade canoate (Tween 40), 2-[2-[3,4-bis(2-methoxyethoxy)oxolan-2-yl]-2-(2-methoxyethoxy) ethoxy]ethyl octadecanoate (Tween 60), Polyoxyethylene sorbitan monostearate, monooctadecanoate and poly(oxy-1,2-ethanediyl), hydroxyethoxy)oxolan-2-yl]-2-(2-hydroxyethoxy) ethoxy]ethyl ({E})-octadec-9-enoate (Tween 80).

In an embodiment the surfactant used is 2-[2-[3,4-bis(2-hydroxyethoxy)oxolan-2-yl]-2-(2-hydroxyethoxy)ethoxy] ethyl dodecanoate (polysorbate 20 or Tween 20) or 2-[2-[3, 4-bis(2-methoxyethoxy)oxolan-2-yl]-2-(2-methoxyethoxy) ethoxy]ethyl hexade canoate (Tween 40) or 2-[2-[3,4-bis(2-methoxyethoxy)oxolan-2-yl]-2-(2-methoxyethoxy) ethoxy] ethyl octadecanoate (Tween 60) or Polyoxyethylene sorbitan monostearate, monooctadecanoate or poly(oxy-1,2-ethanediyl), hydroxyethoxy)oxolan-2-yl]-2-(2-hydroxyethoxy)ethoxy]ethyl (~{E})-octadec-9-enoate (Tween 80).

The alkyl poly glycoside for example 3~{R},4~{S},5~{S},6~{R})-2-decoxy-6-(hydroxymethypoxane-3,4,5-triol(Decyl glucoside), (3~{R},4~{S},5~{S},6~{R})-2-dodecoxy-6-(hydroxymethyl)oxane-3,4,5-triol (Lauryl glucoside) and (3~{R}, 4~{S},5~{S},6~{R})-2-dodecoxy-6-(hydroxymethyl)oxane-3,4,5-triol (Octyl glucoside).

The amine oxides may be {N},~{N}-dimethyldodecan-1-amine oxide (Lauryl dimethylamine oxide).

The ionic surfactant may be selected from the group comprising tetrabutylammonium bromide, tetraoctylammonium bromide, benzyltriethylammonium chloride benzyltripropylammonium chloride, tetrabutylphosphonium chloride); tetrabutylphosphonium bromide, tetraoctylphosphonium bromide, tetraphenylphosphonium bromide hexadecyltrihexylammonium bromide; trioctylethylammonium bromide; tridecylmethylammonium chloride; didodecyldimethyl ammonium chloride; tetraheptyl ammonium iodide; dioctadecyldimethyl ammonium chloride; tridecylbenzylammonium chloride; ditricosylmethylammonium chloride; tributyldecylphosphonium iodide; triphenyldecylphosphonium iodide, tributylhexadecylphosphonium iodide; tricaprylmethylammonium chloride, tri-n-butyl methylammonium chloride); (tetrabutylammonium and benzylalkylammonium salts); (silacrown ethers) tricaprylmethylammonium chloride); tricaprylyldodecylammonium p-toluene sulfonate; tribenzyldecylarsonium chloride; tetranonylammonium hydroxide; tritridecylphenylstibonium chloride; triahentriacontylmethylbismuth chloride; N,N,N',N'-tetramethyl-N,N'-ditetradecyl-p-xylene-α,α'-diammonia dichloride; 1-methyl-1-(N-octadecanoyl-2-aminoethyl)2-heptadecyl-4,5-dihydro-1,3-diazole methylsulfate; N,N,N',N'-tetramethyl-N,N'-dioctadecyl-x-dodecyl-y-xylene α,α'-diammonium dichloride; N,N-dioctadecyl-N-methyl-N-(sodiocarboxylmthyl)-ammonium chloride; N,N,N',N'-tetramethyl-N,N'-dioctadecyl-p-xylene-α,α'-diammonium dichloride; N,N,N',N'-tetramethyl-N,N'dioctadecyl-1,2-ethyl-diammonium dibromide; N,N'-dimethyl-N,N,N',N'-tetraheptadecyl-2-butene-1,4-diammonium chloride.

In an embodiment the initiator is selected from cerium ammonium nitrate various ceric salts, manganese salts, peroxides including hydrogen peroxide, t-butyl peroxide, persulfates such as ammonium persulfate and alkali persulfates azo compounds such as 2,2'-azobis(-2amidino propane)-dihydrochloride, redox catalyst systems, ammonium persulfate coupled with hydrogen peroxide, iron salts, glycolic acid bisulfites.

In an embodiment, the saponification is carried out in presence of base selected from lithium hydroxide (LiOH), Sodium hydroxide (NaOH), Potassium hydroxide (KOH), Rubidium hydroxide (RbOH), Cesium hydroxide (CsOH), Magnesium hydroxide (Mg(OH)2, Calcium hydroxide (Ca(OH)2), Strontium hydroxide (Sr(OH)2), Barium hydroxide (Ba(OH)2) and the like.

In an embodiment the saponification of polymer is carried out at temperature in the range of 25° C. to 100° C.

The superabsorbent polymer obtained according to the present invention is in granular form.

In another aspect, the present invention provides a process for preparation of polysaccharide g-poly (2-propenamide-co-2-propenoic acid) comprising: graft polymerization of monomer in presence of polysaccharide and an initiator to obtain grafted polymer; and saponifying starch grafted polymer in presence of water immiscible solvent and surfactant to obtain granules of superabsorbent polymer.

In an embodiment the graft polymerization is carried out at temperature in the range of 30-50° C.

In an embodiment the process for preparation of superabsorbent polymer comprising
a) graft polymerizing least one monomer capable of forming a superabsorbent polymer, aqueous polysaccharide mixture and initiator to obtain polysaccharide grafted polymer and
b) saponifying the polymer in presence of water immiscible solvent to obtain granulated superabsorbent polymer.

In an embodiment the process for preparation of superabsorbent polymer comprising
a) graft polymerizing least one monomer capable of forming a superabsorbent polymer, aqueous polysaccharide mixture and initiator to obtain polysaccharide grafted polymer and
b) saponifying the polymer in presence of water immiscible solvent and surfactant to obtain granulated superabsorbent polymer.

In an embodiment the process for preparation of starch-g-poly (2-propenamide-co-2-propenoic acid) or its salt comprising
a) graft polymerizing least one monomer capable of forming a superabsorbent polymer, aqueous polysaccharide mixture and initiator to obtain polysaccharide grafted polymer and
b) saponifying starch grafted polymer hydrogel in presence of toluene to obtain granulated superabsorbent polymer.

In an embodiment the process for preparation of starch-g-poly (2-propenamide-co-2-propenoic acid) or its salt comprising
a) graft polymerizing acrylonitrile, aqueous starch mixture and initiator to obtain graft starch polymer and
b) saponifying starch grafted polymer hydrogel in presence of toluene and polysorbate at temperature 50-100° C. to obtain granulated superabsorbent polymer.

The superabsorbent polymer obtained according to present process is in granular form such that at least 50% of particles have less than 8 mesh size.

The particle size can be measured according to Collaborative International Pesticides Analytical Council (CIPAC MT 58) method.

The granular superabsorbent polymer obtained according to present process is having high rate of water absorption capacity, preferably in the range of 400 to 1000 g/g, more preferably 400 to 800 g/g.

In an embodiment the process for preparation of potassium salt of starch-g-poly (2-propenamide-co-2-propenoic acid) comprising
a) graft polymerizing least one monomer capable of forming a superabsorbent polymer, aqueous polysaccharide mixture and initiator to obtain polysaccharide grafted polymer and
b) saponifying starch grafted polymer hydrogel in presence of toluene to obtain granulated superabsorbent polymer.

According to the present invention the process for preparation of superabsorbent polymer comprising
a) forming an aqueous polysaccharide mixture;
b) graft polymerization of monomer on to polysaccharide surface comprising at least one monomer capable of forming a superabsorbent polymer, aqueous polysaccharide mixture and initiator to obtain polysaccharide grafted polymer;

c) saponifying the polysaccharide grafted polymer hydrogel using suitable solvent in presence of suitable surfactant to obtain desired superabsorbent polymer;

d) isolating superabsorbent polymer particles as granules and e) optionally purifying the superabsorbent polymer using suitable solvent.

The granular superabsorbent polymer obtained is purified using solvent for example alcohol solvent preferably methanol by a method known to a person skilled in the art.

In a preferred embodiment, the superabsorbent polymer may be starch-g-poly (2-propenamide-co-2-propenoic acid) or its salt.

In an aspect the present invention provides a process for preparation of superabsorbent polymer comprising saponification of starch grafted polymer hydrogel in presence of suitable solvent.

In an aspect the present invention provides a process for preparation of superabsorbent polymer comprising saponification of starch grafted polymer hydrogel in presence of suitable surfactant.

In a particular embodiment, the saponification comprises heating the mixture of starch grafted polymer, base, solvent and surfactant at a temperature in the range of about 50° C. and 100° C. In other embodiments, the mixture is heated for example at least for 1 hour, at least 2 hours or at least 3 hours.

In one embodiment, the base is potassium hydroxide, the solvent is water immiscible solvent. In some embodiment, the solvent is aromatic solvent. In a further embodiment, the solvent is toluene.

In some embodiment, the surfactant is polysorbate selected from 2-[2-[3,4-bis(2-hydroxyethoxy)oxolan-2-yl]-2-(2-hydroxyethoxy)ethoxy]ethyl dodecanoate (polysorbate or Tween 20), 2-[2-[3,4-bis(2-methoxyethoxy)oxolan-2-yl]-2-(2-methoxyethoxy)ethoxy]ethyl hexade canoate (Tween 40, 2-[2-[3,4-bis(2-methoxyethoxy)oxolan-2-yl]-2-(2-methoxyethoxy) ethoxy]ethyl octadecanoate (Tween 60), Polyoxyethylene sorbitan monostearate, monooctadecanoate and poly(oxy-1,2-ethanediyl), hydroxyethoxy)oxolan-2-yl]-2-(2-hydroxyethoxy) ethoxy]ethyl (~{E})-octadec-9-enoate (Tween 80) or mixtures thereof.

In some embodiment, the surfactant is polysorbate.

In an embodiment, the salt of starch-g-poly (2-propenamide-co-2-propenoic acid) is selected from potassium salt or ammonium salt.

In an embodiment, the present invention provides a process for preparation of potassium salt of starch-g-poly (2-propenamide-co-2-propenoic acid).

According to an embodiment of the present invention the polysaccharide grafted polymer can be prepared by any method known to a person skilled in the art and such grafted polymer is saponified by alkaline hydrolysis in presence of water immiscible solvent for example toluene and surfactant for example polysorbate according to the present invention.

In an embodiment, the present invention provides a process for preparation of potassium salt of starch-g-poly (2-propenamide-co-2-propenoic acid).

In an embodiment, the present invention provides the process for preparation of potassium salt of starch-g-poly (2-propenamide-co-2-propenoic acid) comprising hydrating pre-gelatenized starch with water at temperature range of 25-35° C. and an initiator for example ceric ammonium nitrate is added to the hydrated starch solution; treating acrylonitrile with activated hydrated mixture and the resulting mixture was maintained at 30-45° C. with stirring to obtain the graft starch polymer; saponifying the graft polymer in water immiscible solvent for example toluene using surfactant and base at temperature 50-100° C.; the dough thus formed is uniformly dispersed in the solvent enabling the resultant polymer to be easily stirred and processable to obtain dried granulated product.

Typically, the resultant super absorbent polymer prepared according to the present invention is manageable to handle in normal reactor and making the further processability of the polymer much easier. Additionally, the polymer granules thus obtained have high water absorbing capacity particularly in the range of 200-2000 g/g. In preferred embodiment the polymer granules obtained according to present invention have high water absorbing capacity particularly in the range of 400-1000 g/g, preferably in the range of 400-800 g/g.

The advantage of the present process for preparing superabsorbent polymer (SAP) comprising saponification of starch grafted polymer according to the procedure as described above, can be easily carried out in simple glass reactor. Thus, this process is simple, economical and feasible at industrial scale.

The present inventors found that during the normal bulk polymerization, a thick viscous dough of the starch grafted co-polymer (viscosity 1000000 Cp) is formed which is extremely hard to manage at industrial scale and entails a specific reactor to handle the dough and process the high viscous material during granulation. The inventor of the present invention invented a process that controls formation of highly viscous starch grafted copolymer, gives desired granulated product and allows amenable and manageable quality of the resultant dough so that it can be handled in simple reactor commercially.

In an embodiment the process of present invention provides superabsorbent polymer particles capable of absorbing aqueous fluids.

Important advantage of the present process is that it provides a super absorbent polymer having high water absorption energy and it can be seen from FIG. 1 which indicates larger water absorption as cumulative time increased within 0.15 hour to 8 hours for the SAP.

Thus, according to the present invention, the rate of water absorption capacity of SAP is high.

In one embodiment, the SAP prepared according to process described herein may desirably have material properties, such as viscosity, hardness, bulk density, water absorption ability and tensile strength, suited to various uses and applications, such as at least one of agricultural, medical, bioengineering and chemical applications or purposes.

In an aspect the present invention provides a composition comprising at least one superabsorbent polymer prepared according to present process and at least one plant advantageous additive.

In an embodiment, the plant advantageous additive is selected from fertilizers, mycorrhiza, micronutrients, acaricides, algicides, antifeedants, avicides, bactericides, bird repellents, chemosterilants, fungicides, herbicide safeners, herbicides, insect attractants, insect repellents, insecticides, mammal repellents, mating disruptors, molluscicides, nematicides, plant activators, plant-growth regulators, rodenticides, synergists, virucides, derivatives thereof, biological control agents and mixtures thereof.

In any aspect or embodiment described hereinafter, the term "composition" shall be intended to include both the compositions formed at the time of, or immediately before, the intended application or a pre-formulated composition.

In an aspect, the composition may additionally comprise mycorrhiza, micronutrients including but not limited to amino acids and other agronomically advantageous plant additives thereof.

Further additives such as inert fillers, binding agents, surfactants, dispersing agents and the like may be added to the composition of the present invention.

In an embodiment, the inert fillers and/or binding agents may be selected from but not limited to kaolin, sucrose, lactose, mineral earths and clays such as bentonite, perlite, talc, kaolin, aluminum silicate, diatomaceous earth, attapulgite, clay, barium sulfate, mica, zeolites, calcium carbonate, fused sodium potassium, precipitated silica, precipitated silicates, aluminum silicate, sodium citrate, potassium citrate and magnesium citrate.

The composition of the present invention may be applied in granular form, or in a powder form or in a liquid form or in any other agrochemically acceptable form of delivery.

In a preferred embodiment, the improved composition of the present invention is in the form of granules.

In one preferred embodiment the composition of the present invention may be applied to plant, root, seed, or seedling by various methods, including, but not limited to dipping the plant, root, seed, or seedling into the superabsorbent polymer composition, a slurry of the superabsorbent polymer composition, or a paste including the superabsorbent polymer composition of the invention; mixing another plant growth media with the superabsorbent polymer composition and later planting a plant, root, seed, or seedling into the plant growth media comprising the superabsorbent polymer composition of the invention; or forming a slurry of the superabsorbent polymer composition that is applied directly to the growing substrate.

In an embodiment, the superabsorbent polymer may be present within the compositions of the invention in the range of at least 0.1 to up to 100 grams per 100 g by weight of the composition. In a preferred embodiment, the quantity of superabsorbent polymer may be in the range of at least 0.1 to 50 grams per 100 g by weight of the composition. In a preferred embodiment, the quantity of superabsorbent polymer may be in the range of at least 0.1 to 10 gm per 100 g by weight of the composition.

In another aspect, the present invention provides a method of improving the quality of plants and/or soil comprising contacting the soil with a composition comprising a superabsorbent polymer.

In an embodiment, the method comprises applying the superabsorbent polymer composition of the invention into the root zone of the plants.

In an embodiment, the present invention provides a method for improving the yield of a crop by applying the superabsorbent polymer composition of the invention to plant propagation material selected from, but not limited to seeds, plant propagules such as suckers, corms, bulbs, fruit, tubers, grains, cuttings and cut shoots.

In an embodiment, the present invention provides a method for improving the yield of a crop by applying the superabsorbent polymer composition of the invention to roots of the plant.

In another embodiment, the present invention provides a method for improving the yield of a crop by applying the superabsorbent polymer composition of the invention to foliar parts of the plant.

In any aspect or embodiment described hereinabove, the term "superabsorbent polymer composition of the invention" shall be understood to include a composition comprising a superabsorbent polymer prepared according to the present invention.

In an aspect, the superabsorbent polymer and optionally the plant advantageous additive may be packaged as a kit-of-parts which facilitates the addition of the superabsorbent polymer and optionally the plant advantageous additive at the time of application.

Therefore, in this aspect, the present invention provides a multi-pack agricultural product comprising at least one superabsorbent polymer; optionally a third container comprising at least one plant advantageous additive; and an instruction manual instructing an user to administer the admixture to a locus.

The advantages offered by the present invention will be more apparent from the examples set forth herein below. These examples are provided merely as illustrations of the invention and are not intended to be construed as a limitation thereof.

EXAMPLES

Example 1

In a glass reactor starch (pre-gelatinized, 84 g) was hydrated with water (900 g) at 30° C. for 1 hr. Ceric ammonium nitrate (2.6 g) was dissolved in water (55 g) and added to the hydrated starch solution for activation. Acrylonitrile (91 g) was added to the activated mixture and the resulting mixture was maintained at 30-45° C. with stirring for 3 h to obtain the graft starch polymer. The graft polymer was then transferred to the saponification chamber and toluene (600 g) was added to the mixture followed by 2.5 g of the polysorbate and treated with KOH solution (45% solution). The reaction mixture was heated to 95° C. and maintained at this temperature for 2 h. A vacuum was applied to accelerate the scrubbing of the liberated ammonia into a predetermined concentration of sulfuric acid during saponification. The dough (1.3 kg) thus formed was uniformly dispersed in the toluene solvent enabling the resultant polymer to be easily stirred and processable. The mixture was cooled to 25° C. and methanol (1.4 kg) was added to the mixture. The mixture was stirred, filtered and washed with methanol twice to obtain the wet cake. The wet cake (660 g) obtained was dried to give 245 g of the dried granulated product Yield 93%

Water absorption capacity: 550 g/g

Example 2

The graft starch polymer (1130 g) produced according to example 1 and toluene (600 g) was added in a reactor and treated with KOH (147 g, 45%) solution. The reaction mixture was heated to 95° C. and maintained at this temperature for 2 h. The dough (1.3 kg) thus formed was uniformly dispersed in the toluene solvent enabling the resultant polymer to be easily stirrable and processable. The reaction was cooled to 25° C. and methanol (1.4 kg) was added to the mixture and stirred. The reaction mixture was then filtered and washed with methanol twice and filtered. The wet cake (660 g) obtained was dried to give dried of the granulated product (238 g).

Yield: 91%: Water absorption capacity: 430 g/g

Comparative Example

Distilled water (1400 ml) was placed in a 3-liter resin kettle and was subjected to constant agitation with a stirrer.

Starch flour or meal (110 g) was slowly added to the kettle, and the resulting mixture was stirred for approximately five minutes. A slow stream of nitrogen gas was added to the mixture while the mixture was heated until it reached a temperature of approximately 95° C. Upon reaching this temperature, the mixture was maintained at this temperature and stirred for approximately 45 minutes to ensure that the starch was gelatinized. The heating mantle was then removed, and the resin kettle was placed in a cold-water bucket bath. The mixture was continuously stirred under nitrogen until the temperature reached 25° C. Acrylonitrile (115 g) and 2-acrylamido-2-methyl-propanesulfonic acid (23 g) were added. The resulting mixture was continuously stirred under nitrogen for approximately 10 minutes. A catalyst solution including cerium ammonium nitrate (5.5 g) dissolved in 0.1 M nitric acid solution (50 ml) was added to the mixture while the mixture cooled. The mixture was continuously stirred under nitrogen while the resin kettle remained in the cold-water bucket for approximately 60 minutes. The temperature of the mixture at the end of the 60 minutes was approximately 40° C. The resulting mixture was transferred to a ribbon paddle reactor equipped with horizontal ribbon blades to churn the mixture. A solution including potassium hydroxide flakes (90 g) dissolved in water (200 g) was added to the mixture during stirring and heating with the help of steam. The mixture was stirred and heated until a temperature of 95° C. was achieved, after which the mixture was stirred for an additional 60 minutes. The resulting dough polymer hydrogel mass was difficult to stir in ordinary reactors and therefore required horizontal ribbon blades to cut and thoroughly mix the dough with a 10% solution of hydrochloric acid used for neutralization it to a pH of 7.5. The resulting dough was then cooled to a temperature of about 40° C. The viscous dough was immersed in methanol to precipitate the final polymer product. Yield obtained 90%, WAC of the resultant polymer was 400-450 g/g.

TABLE 1

Comparative table of water absorbance (WA) capacity.

| Time (Hour) | Example 1 WA (g/g) | Comparative example WA (g/g) |
|---|---|---|
| 0.15 | 351 | 152 |
| 0.3 | 380 | 222 |
| 0.45 | 411 | 271 |
| 1 | 468 | 303 |
| 2 | 532 | 391 |
| 4 | 527 | 436 |
| 6 | 526 | 450 |
| 8 | 526 | 458 |

Example 3

In a glass reactor starch (pre-gelatenized, 84 g) was hydrated with water (900 g) at 30° C. for 1 hr. Ceric ammonium nitrate (2.6 g) was dissolved in water (55 g) and added to the hydrated starch solution for activation. Acrylonitrile (91 g) was added to the activated mixture and the resulting mixture was maintained at 30-45° C. with slow stirring for 3 h to obtain the graft starch polymer. The graft polymer was then transferred to the saponification chamber and toluene (600 g) was added to the mixture followed by addition of polysorbate (2.5 g) and treated with KOH solution (45% solution). The reaction mixture was heated to 95° C. and maintained at this temperature for 5 h. A vacuum was applied to accelerate the scrubbing of the liberated ammonia into a predetermined concentration of sulfuric acid during saponification. The dough (1.3 kg) thus formed was uniformly dispersed in the toluene solvent enabling the resultant polymer to be easily stirred and processable. The mixture was cooled to 25° C. and methanol (1.4 kg) was added to the mixture. The mixture was stirred for 15 minutes, decant solvent layer and washed with methanol twice to obtain the wet cake. The wet cake (660 g) obtained was dried to give dried granulated product (245 g) and at least 58% of particles have mesh size less than 8.

Yield 93%

Water absorption capacity: 590 g/g

TABLE 2

Comparative table of water absorbance capacity between Comparative example & Example -III

| Time (hour) | Example 3 WA (g/g) | Comparative Example WA (g/g) |
|---|---|---|
| 0.15 | 391 | 152 |
| 0.3 | 440 | 222 |
| 0.45 | 490 | 271 |
| 1 | 520 | 303 |
| 2 | 590 | 391 |
| 4 | 595 | 436 |
| 6 | 590 | 450 |
| 8 | 592 | 458 |

Comparative Graph table of water absorbance capacity between Comparative example and Example -3 are shown in FIG. 1.

Example 4

In a glass reactor starch (pre-gelatenized, 84 g) was hydrated with water (900 g) at 30° C. for 1 hr. Ceric ammonium nitrate (2.6 g) was dissolved in water (55 g) and added to the hydrated starch solution maintained 20 min. for activation. Acrylonitrile (91 g) was added to the activated mixture and the resulting mixture was maintained at 30-45° C. with slow stirring for 3 h to obtain the graft starch polymer. The graft polymer was then transferred to the saponification chamber and toluene (600 g) was added to the mixture followed by addition of polysorbate (3.5 g) and treated with KOH solution (45% solution). The reaction mixture was heated to 95° C. and maintained at this temperature for 5 hours. A slight vacuum was applied to accelerate the scrubbing of the liberated ammonia into a predetermined concentration of sulfuric acid during saponification. The dough (1.3 kg) thus formed was uniformly dispersed in the toluene enabling the resultant polymer to be easily stirred and processable. The mixture was cooled to 25° C. and methanol (1.4 kg) was added slowly to the mixture. The mixture was stirred for 15 minutes, decant solvent layer and washed with methanol twice to obtain the wet cake. The wet cake (660 g) obtained was dried to give 242.4 g of the dried granulated product Yield: 92%

Water absorption capacity: 610 g/g

Example 5

In a glass reactor starch (pre-gelatenized, 84 g) was hydrated with water (900 g) at 30° C. for 1 hr. Ceric ammonium nitrate (2.6 g) was dissolved in water (55 g) and added to the hydrated starch solution maintained 20 min. for activation. Acrylonitrile (91 g) was added to the activated mixture and the resulting mixture was maintained at 30-45° C. with slow stirring for 3 h to obtain the graft starch polymer. The graft polymer was then transferred to the saponification chamber and heptane (474 g) was added to the mixture followed by 2.5 g of the polysorbate and treated with KOH solution (45% solution). The reaction mixture was heated to 85° C. and maintained at this temperature for 8 h. A slight vacuum was applied to accelerate the scrubbing of the liberated ammonia into a predetermined concentration of sulfuric acid during saponification. The dough (1.3 kg) thus formed was uniformly dispersed in the heptane solvent enabling the resultant polymer to be easily stirred and processable. The mixture was cooled to 25° C. and methanol (1.4 kg) was added slowly to the mixture. The mixture was stirred for 15 minutes, decant solvent layer and washed with methanol twice to obtain the wet cake. The wet cake (660 g) obtained was dried to give 245 g of the dried granulated product Yield 93%

Water absorption capacity: 530 g/g

Example 6

In a glass reactor starch (pre-gelatenized, 84 g) was hydrated with water (900 g) at 30° C. for 1 hr. Ceric ammonium nitrate (2.6 g) was dissolved in water (55 g) and added to the hydrated starch solution maintained 20 min. for activation. Acrylonitrile (91 g) was added to the activated mixture and the resulting mixture was maintained at 30-45° C. with slow stirring for 3 h to obtain the graft starch polymer. The graft polymer was then transferred to the saponification chamber and toluene (600 g) was added to the mixture followed by 2.5 g of the polysorbate and treated with KOH solution (45% solution). The reaction mixture was heated to 95° C. and maintained at this temperature for 5 h. A slight vacuum was applied to accelerate the scrubbing of the liberated ammonia into a predetermined concentration of sulfuric acid during saponification. The dough (1.3 kg) thus formed was uniformly dispersed in the toluene solvent enabling the resultant polymer to be easily stirred to give 245 g of the dried granulated product Yield 93%

Water absorption capacity: 568 g/g

Example 7

The graft starch polymer (1130 g) produced according to example 3, cyclohexane (540 g) and 2.5 g of the polysorbate was added in a reactor a treated with KOH (147 g, 45%) solution. The reaction mixture was heated to 78° C. and maintained at this temperature for 12 h. The dough (1.3 kg) thus formed was uniformly dispersed in the cyclohexane solvent enabling the resultant polymer to be easily steerable and processable. The reaction was cooled to 25° C. and methanol (1.4 kg) was added to the mixture and stirred. The reaction mixture was then filtered and washed with methanol twice and filtered. The wet cake (652 g) obtained was dried to give 243.7 g of the dried of the granulated product.

Yield: 92.5%

Water absorption capacity: 515 g/g

Example 8

The graft starch polymer (1130 g), o-xylene (600 g) and 2.5 g of the polysorbate was added in a reactor a treated with KOH (147 g, 45%) solution. The reaction mixture was heated to 95° C. and maintained at this temperature for 6 h. The dough (1.3 kg) thus formed was uniformly dispersed in the o-xylene solvent enabling the resultant polymer to be easily steerable and processable. The reaction was cooled to 25° C. and methanol (1.4 kg) was added to the mixture and stirred. The reaction mixture was then filtered and washed with methanol twice and filtered. The wet cake (645 g) obtained was dried to give 245 g of the dried of the granulated product.

Yield: 93%

Water absorption capacity: 545 g/g

Example 9

The graft starch polymer (1130 g), Ethylene dichloride (865 g) and 2.5 g of the polysorbate was added in a reactor a treated with KOH (147 g, 45%) solution. The reaction mixture was heated to 81° C. and maintained at this temperature for 6 h. The dough (1.3 kg) thus formed was uniformly dispersed in the Ethylene dichloride solvent enabling the resultant polymer to be easily steerable and processable. The reaction was cooled to 25° C. and methanol (1.4 kg) was added to the mixture and stirred. The reaction mixture was then filtered and washed with methanol twice and filtered. The wet cake (322 g) obtained was dried to give 247 g of the dried of the granulated product.

Yield: 94%

Water absorption capacity: 405 g/g

The invention claimed is:

1. A method for preparing a superabsorbent polymer of starch-g-poly-(2-propenamide-co-2-propenoic acid) or its salt, comprising:
   a) hydrating the pre-gelatinized starch with water at a temperature in the range of 25-35° C. and adding ammonium-cerium nitrate to the hydrated starch solution as an initiator for activation;
   b) adding acrylonitrile to the activated mixture and holding the resulting mixture at 30-45° C. while stirring to obtain a starch-grafted polymer;
   c) saponifying the starch-grafted polymer in the presence of a solvent selected from chlorinated hydrocarbons, aliphatic hydrocarbons, aromatic hydrocarbons, or mixtures thereof, using polysorbate as a nonionic surfactant, and a base solution at 50-100° C.; to create the superabsorbent polymer suspended in the solvent, wherein the base in the base solution is selected from a group consisting of lithium hydroxide, sodium hydroxide, potassium hydroxide, rubidium hydroxide, cesium hydroxide, magnesium hydroxide, calcium hydroxide, strontium hydroxide $(Sr(OH)_2)$ or barium hydroxide $(Ba(OH)_2)$;
   d) obtaining the superabsorbent polymer; and wherein the obtained superabsorbent polymer has a water absorbing capacity above 500 grams per gram.

2. The method of claim 1 further comprising: at step a) additionally adding a polysaccharide.

3. The method of claim 1, wherein the granular superabsorbent polymer is purified using a solvent.

4. The method of claim 1, wherein at least 50% of particles of the granular product have less than 8 mesh size.

5. The method of claim 1, further comprising: at step c), adding an ionic surfactant in addition to the polysorbate nonionic surfactant; wherein the ionic surfactant is selected from a group consisting of tetrabutylammonium bromide, tetraoctylammonium bromide, benzyltriethylammonium chloride benzyltripropylammonium chloride, tetrabutylphosphonium chloride); tetrabutylphosphonium bromide, tetraoctylphosphonium bromide, tetraphenylphosphonium bromide hexadecyltrihexylammonium bromide; trioctylethylammonium bromide; tridecylmethylammonium chloride; didodecyldimethylammonium chloride; tetraheptylammonium iodide; dioctadecyldimethyl ammonium chloride; tridecylbenzylammonium chloride; ditricosylmethylammonium chloride; tributyldecylphosphonium iodide; triphenyldecylphosphonium iodide, tributylhexadecylphosphonium iodide; tricaprylmethylammonium chloride, tri-n-butylmethylammonium chloride); (tetrabutylammonium and benzylalkylammonium salts); (silacrown ethers) tricaprylmethylammonium chloride); tricaprylyldodecylammonium p-toluene sulfonate; tribenzyldecylarsonium chloride; tetranonylammonium hydroxide; tritridecylphenylstibonium chloride; triahentriacontylmethylbismuth chloride; N,N,N',N'-tetramethyl-N,N'-ditetradecyl-p-xylene-α,α'-diammonia dichloride; 1-methyl-1-(N-octadecanoyl-2-aminoethyl) 2-heptadecyl-4,5-dihydro-1,3-diazole methylsulfate; N,N,N',N'-tetramethyl-N,N'-dioctadecyl-x-dodecyl-y-xylene-α,α'-diammonium dichloride; N,N-dioctadecyl-N-methyl-N-(sodiocarboxylmethyl)-ammonium chloride; N,N,N',N'-tetramethyl-N,N'-dioctadecyl-p-xylene-α,α'-diammonium dichloride; N,N,N', N'-tetramethyl-N,N'-dioctadecyl-1,2-ethyl-diammonium dibromide; and N,N'-dimethyl-N,N,N',N'-tetraheptadecyl-2-butene-1,4-diammonium chloride.

\* \* \* \* \*